(12) United States Patent
Shingu

(10) Patent No.: US 7,679,643 B2
(45) Date of Patent: Mar. 16, 2010

(54) REMOTE INSTRUCTION SYSTEM, REMOTE INSTRUCTION METHOD, AND PROGRAM PRODUCT FOR REMOTE INSTRUCTION

(75) Inventor: Jun Shingu, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 818 days.

(21) Appl. No.: 11/487,568

(22) Filed: Jul. 17, 2006

(65) Prior Publication Data

US 2007/0177013 A1    Aug. 2, 2007

(30) Foreign Application Priority Data

Feb. 2, 2006    (JP) .............................. 2006-026257

(51) Int. Cl.
H04N 7/18 (2006.01)
H04N 5/225 (2006.01)
H04N 5/232 (2006.01)
G03B 21/26 (2006.01)

(52) U.S. Cl. .................. 348/207.11; 348/136; 348/142; 348/211.4; 348/211.9; 353/28

(58) Field of Classification Search ................. 348/136, 348/142, 207.1, 207.11, 211.99, 211.1, 211.4, 348/211.6, 211.8, 211.11–211.14, 211.9; 353/28, 40–41; 715/848–851
See application file for complete search history.

(56) References Cited

U.S. PATENT DOCUMENTS

| | | | |
|---|---|---|---|
| 5,434,617 A * | 7/1995 | Bianchi ...................... 348/170 |
| 6,392,694 B1 * | 5/2002 | Bianchi ...................... 348/169 |
| 6,597,410 B1 * | 7/2003 | Doany et al. ................. 348/744 |
| 6,853,809 B2 * | 2/2005 | Pelletier ...................... 396/85 |
| 7,134,080 B2 * | 11/2006 | Kjeldsen et al. ............. 715/730 |
| 2004/0070674 A1 * | 4/2004 | Foote et al. ............ 348/207.99 |
| 2005/0041096 A1 * | 2/2005 | Horita ......................... 348/42 |
| 2006/0290786 A1 * | 12/2006 | Tokai .................... 348/211.99 |

FOREIGN PATENT DOCUMENTS

CN    1658670 A    8/2005

* cited by examiner

Primary Examiner—Sinh Tran
Assistant Examiner—Daniel M Pasiewicz
(74) Attorney, Agent, or Firm—Oliff & Berridge, PLC

(57) ABSTRACT

A remote instruction system includes a control portion. The control portion transmits a first image to a remote terminal and controls a projection portion to project a first annotation image onto a subject according to an instruction issued from the remote terminal on the basis of the first image, and the control portion transmits a second image to the remote terminal and controls the projection portion to project a second annotation image onto the subject according to the instruction issued from the remote terminal on the basis of the second image, the first image being captured by a first image capturing portion provided for capturing the first image of the subject, the second image being captured by a second image capturing portion provided for zooming a given area of the subject to capture the second image, when the given area in the first image is selected from the remote terminal.

10 Claims, 11 Drawing Sheets

$(x_a, y_a) = g(x_b, y_b)$

REMOTE INSTRUCTION SYSTEM, REMOTE INSTRUCTION METHOD, AND PROGRAM PRODUCT FOR REMOTE INSTRUCTION

BACKGROUND

1. Technical Field

This invention generally relates to a remote instruction system and a remote instruction method.

2. Related Art

In a remote conference system, various instructions have to be given to a real object side from a remote side. As an example of the remote instruction system where an instruction can be given from the remote side to the real object side, there is known a technique of projecting an annotation image determined on a remote terminal on the basis of a captured image onto a target object from a projector on the real object side, while the target object existent on the real world side is being captured by a camcorder and such captured image being transmitted to the remote terminal.

SUMMARY

An aspect of the present invention provides a remote instruction system including a control portion. The control portion transmits a first image to a remote terminal and controls a projection portion to project a first annotation image onto a subject according to an instruction issued from the remote terminal on the basis of the first image. The control portion transmits a second image to the remote terminal and controls the projection portion to project a second annotation image onto the subject according to the instruction issued from the remote terminal on the basis of the second image. The first image is captured by a first image capturing portion provided for capturing the first image of the subject, and the second image is captured by a second image capturing portion provided for zooming a given area of the subject to capture the second image, when the given area in the first image is selected from the remote terminal.

BRIEF DESCRIPTION OF THE DRAWINGS

Embodiments of the present invention will be described in detail based on the following figures, wherein.

DETAILED DESCRIPTION

Figure 1:
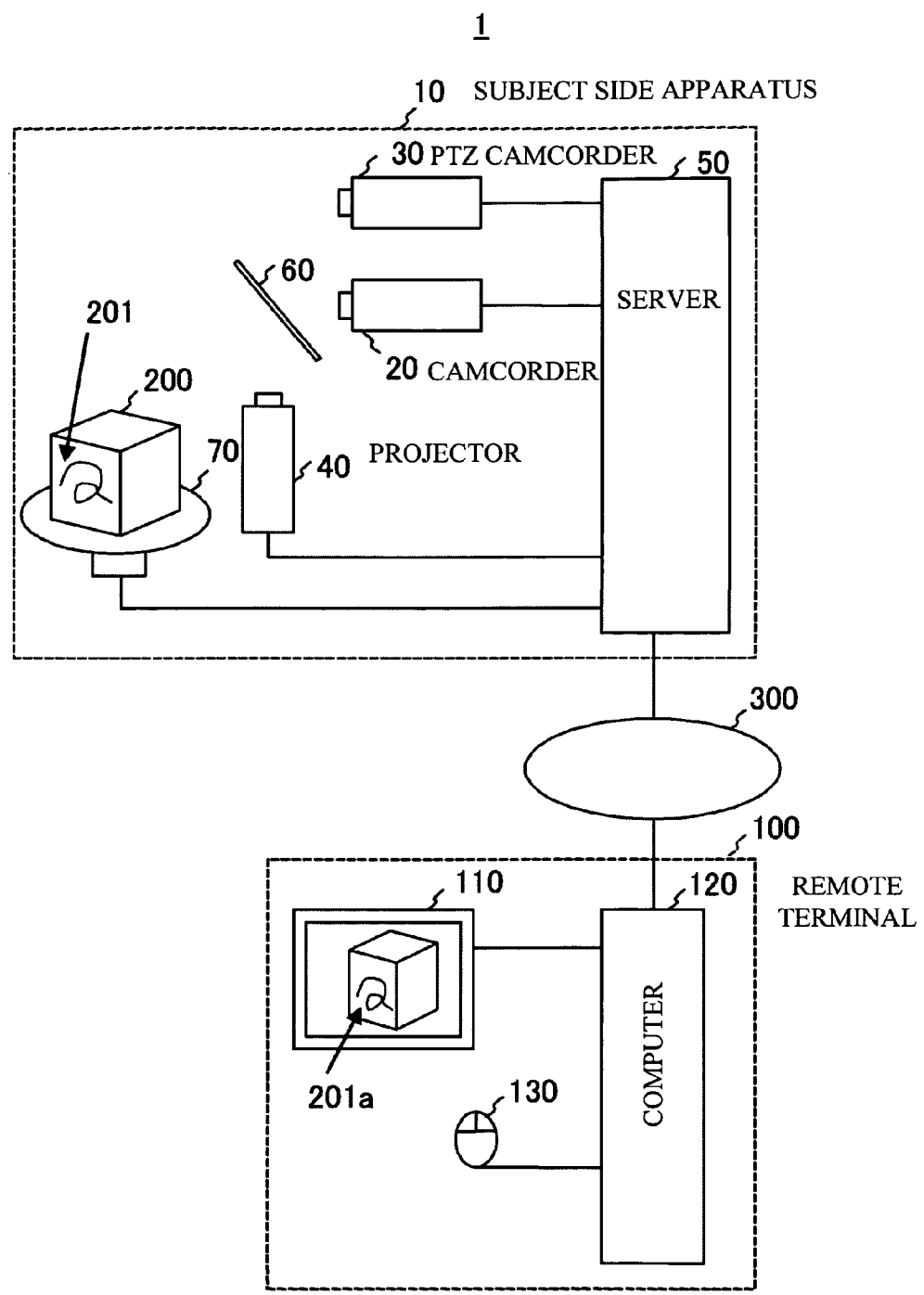
FIG. 1 is a configuration diagram illustrating an exemplary embodiment of a remote instruction system.

A description will now be given, with reference to the accompanying drawings, of embodiments of the present invention. FIG. 1 is a configuration diagram illustrating an exemplary embodiment of a remote instruction system 1. The remote instruction system 1 includes a subject side apparatus 10 and a remote terminal 100. The subject side apparatus 10 and the remote terminal 100 are connected to each other to enable mutual communication by a network 300. In FIG. 1, only one remote terminal 100 is shown, however, multiple remote terminals 100 can be connected to a server 50, as will be discussed later, of the subject side apparatus 10 through the network 300.

The subject side apparatus 10 is composed of a camcorder 20 serving as a first image capturing portion, a PTZ camcorder 30 serving as a second image capturing portion, a projector 40 serving as a projection portion, the server 50 serving as a control portion, a half mirror 60, and a rotation stage 70 serving as a relative position changing portion. The camcorder 20 is composed of a CCD camera, for example, to capture a subject (target object) 200 placed on the rotation stage 70, while information of such captured image is being taken into the server 50. The PTZ camcorder 30 is a camera that can pan, tilt, and zoom the subject 200, and magnifies a selected given area in the subject 200 when the given area in the captured image is selected by the remote terminal 100 to capture the image thereof. The positional relationship between the camcorder 20 and the PTZ camcorder 30 are calibrated in advance. The camcorder 20 captures images transmitted through the half mirror 60.

The projector 40 is composed of a liquid crystal projector or the like, and projects an annotation image 201 on to the subject 200, according to an instruction given from the remote terminal 100 on the basis of a captured image. In addition, the projector 40 is arranged in such a manner that an optical system thereof is substantially aligned with an optical principal point of the camcorder 20 by the half mirror 60. The projector 40 projects the annotation image transmitted from the server 50 onto the subject 200 through an optical system thereof and the half mirror 60. The annotation image projected from the projector 40 is reflected by the half mirror 60 and projected onto the subject 200. The annotation image includes any type of image such as line, character, drawing, and the like.

The rotation stage 70 is controlled by the server 50, and the subject 200 placed on a top surface of the rotation stage 70 is rotated, so that the position of the subject 200 with respect to the camcorder 20, the PTZ camcorder 30, and the projector 40 is changed. The server 50 controls operations of the camcorder 20, the PTZ camcorder 30, the projector 40, and the rotation stage 70, while sending and receiving various information to and from the remote terminal 100 over the network 300. In addition, the server 50 sends the image captured by the camcorder 20 to the remote terminal 100, and projects the annotation image onto the subject 200, according to an instruction issued by the remote terminal 100 on the basis of such captured image. Further, the server 50 transmits the image captured by the PTZ camcorder 30 to the remote terminal 100, and projects the annotation image onto the subject 200 by means of the PTZ camcorder 30, according to the instruction on issued by the remote terminal 100 on the basis of the image captured by the PTZ camcorder 30.

The server 50 controls to change a projection position of the annotation image, which is projected by the projector 40, in accordance with the rotation (movement) of the subject 200 placed on the rotation stage 70.

The remote terminal 100 is composed of a display apparatus 110, a computer 120, a pointing device (mouse) 130, and the like. The display apparatus 110 is composed of a liquid crystal display, CRT, or the like. The computer 120 is connected to the network 300. The pointing device 130 is connected to the computer 120. The display apparatus 110 displays images transmitted from the subject side apparatus 10, which are captured by the camcorder 20 and the PTZ camcorder 30, on a display screed thereof. The pointing device 130 is used for operating various buttons by means of a pointer on the display screen on which the captured image is being displayed, so as to create an instruction with respect to the annotation image to be projected onto the subject 200. The pointing device 130 is also used for giving an instruction to rotate the subject 200 with the use of the rotation of the rotation stage 70.

Figure 2:
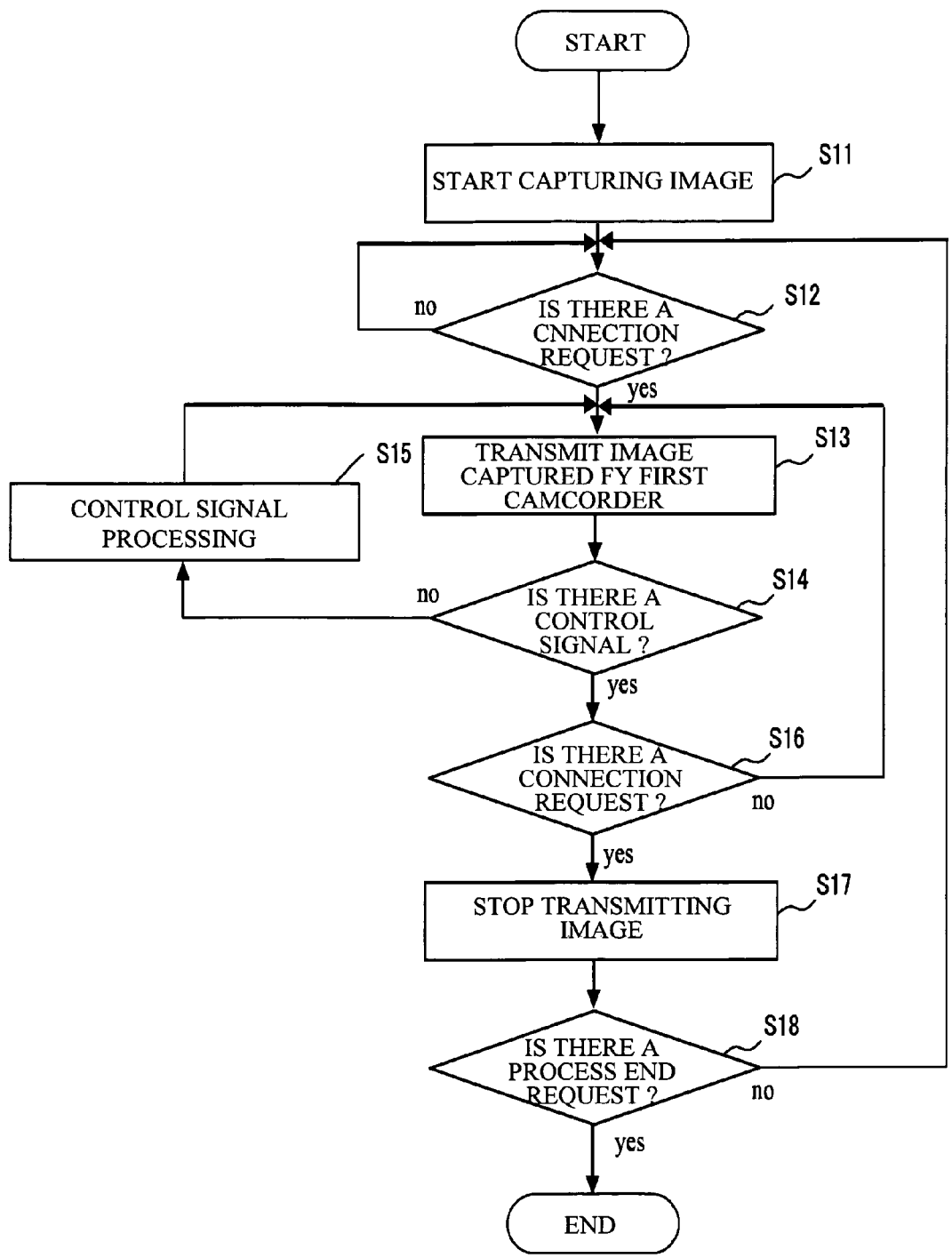
FIG. 2 is a flowchart showing an example process on a server with the use of the camcorder of a subject side apparatus.
Figure 3:
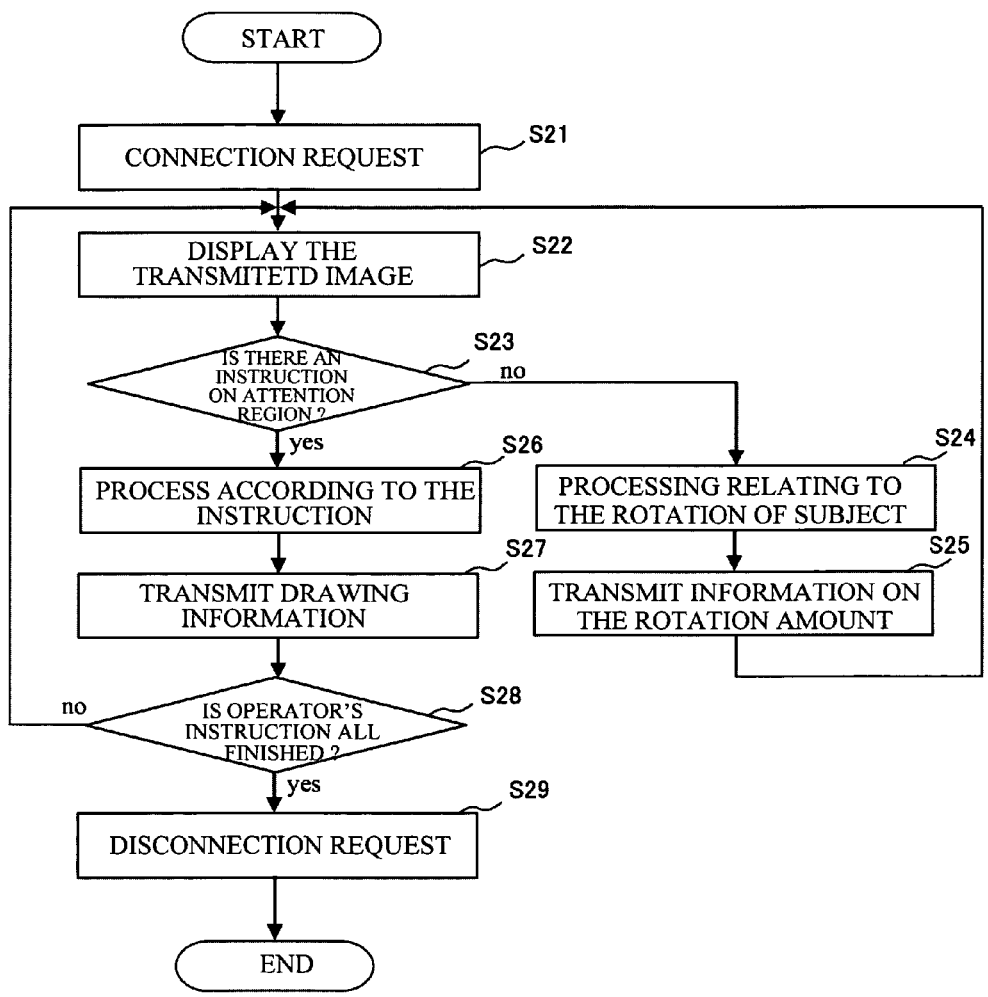
FIG. 3 is a flowchart showing an example process of forming an image on a computer of a remote terminal.
Figure 4:
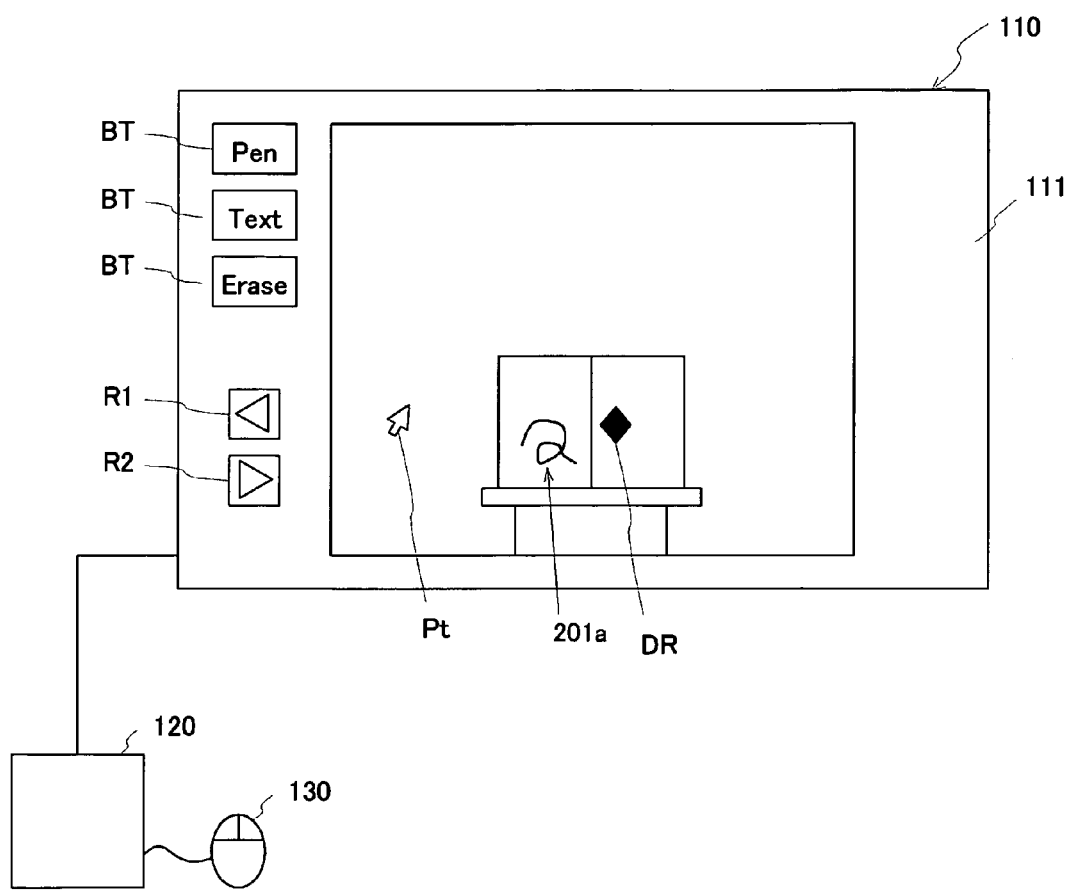
FIG. 4 is a view illustrating an example operation on the side of the remote terminal.

Next, operations of the remote instruction system 1 having the above-described configuration are described with reference to FIG. 2 through FIG. 4. FIG. 2 is a flowchart showing an example process on the server 50 with the use of the camcorder 20 of the subject side apparatus 10. FIG. 3 is a flowchart showing an example process of forming an image on the computer 120 of the remote terminal 100. FIG. 4 is a view illustrating an example operation on the side of the remote terminal 100.

Referring now to FIG. 2, the server 50 of the subject side apparatus 10 starts capturing an image by means of the camcorder 20 (step S11), and determines whether or not there is a connection request from the computer 120 of the remote terminal 100 (step S12). If there is a connection request from the computer 120, the server 50 transmits the image captured by the camcorder 20 to the computer 120 of the remote terminal 100 through the network 300 (step S13).

Subsequently, the server 50 determines whether or not there is a transmission of a control signal from the computer 120 (step S14). The control signal includes a drawing signal and a position control signal, the drawing signal being information on drawing of the annotation image, the position control signal being provided for rotating the rotation stage 70. If the server 50 receives the afore-described control signal, the server 50 performs a control signal processing according to the content of the control signal (step S15).

Meanwhile, if the server 50 does not receive the above-described control signal, the server 50 determines whether or not there is a disconnection request (step S16). If there is no disconnection request, the server 50 goes back to step S13 and transmits a newly captured image to the computer 120 of the remote terminal 100 through the network 300. If there is a disconnection request, the server 50 stops transmitting the image captured by the camcorder 20 (step S17). Then, the server 50 determines whether or not there is a process end request (step S18). If there is no end request, processing goes back to step S12 to repeat the above-described processes. If there is a process end request, processing is terminated.

Next, a description is given of the operation of the remote terminal 100. Firstly, as shown in FIG. 3, the computer 120 of the remote terminal 100 issues a connection request to the server 50 (step S21). Then, after the connection is established, for example, as shown in FIG. 4, the computer 120 displays the captured image being transmitted from the server 50 of the subject side apparatus 10 on a display screen 111 of the display apparatus 110 (step S22).

Subsequently, the computer 120 determines whether or not there is an instruction on an attention region in the captured image given by an operator (step S23). If there is an instruction on the attention region, the process according to the instruction is performed (step S26). Specifically, if there is a region in the image being displayed onto which the operator likes to project an annotation image 201a, the operator of the remote terminal 100 operates the pointing device 130 to move a pointer Pt on the display screen 111 and issues an instruction on an attention region DR, while watching the image on the display screen 111 of the display apparatus 110, as shown in FIG. 4. The attention region is a region that defines a projection position onto which the annotation image 201a is to be projected. At this time, the operator simultaneously issues an instruction of the information on the annotation image 201a to be projected onto the attention region.

For example, it is possible to instruct graphic information such as drawn rectangle or circle, bitmap images prepared in advance, text information input from the keyboard, by operating various buttons BT or the like formed on the display screen 111 with the use of the pointing device 130. The computer 120 transmits various types of information specified at step S26 to the server 50 as drawing information (step S27).

Next, the computer 120 determines whether or not the operator's instruction issued from the remote terminal 100 on the basis of the image captured by the camcorder 20 has been completed (step S28). If the instruction is completed, a disconnection request is issued to the server 50 (step S29) and the processing is terminated. If the instruction issued by the operator of the remote terminal 100 is not completed, processing goes back to step S22 to repeat the above-described processes.

Here, if the operator of the remote terminal 100 likes to rotate the subject 200, the operator operates rotation buttons R1 and R2 to instruct a rotation direction and rotation amount of the rotation stage 70, while watching the image being displayed on the display screen 111 as shown in FIG. 4, so that the region in the subject 200 in the captured image onto which the operator likes to project the annotation image may be displayed or a viewing location of the subject 200 may be most appropriate. The rotation buttons R1 and R2 are provided on the display screen 111 to rotate the rotation stage 70. At step S23, if there is no instruction on the attention region (there is no instruction on the annotation image), the computer 120 determines that an instruction on the rotation of the subject 200 is to be given, and performs processing relating to the rotation of the subject 200 (step S24).

Then, the computer 120 transmits information on the rotation mount (movement amount information), which has been obtained by the process relating to the rotation of the subject 200, to the server 50 of the subject side apparatus 10 (step S25). This rotates the rotation stage 70 and changes the rotation position of the subject 200 on the subject side apparatus 10. A newly captured image is displayed on the display apparatus 110 of the remote terminal 100 (step S22).

Figure 5:
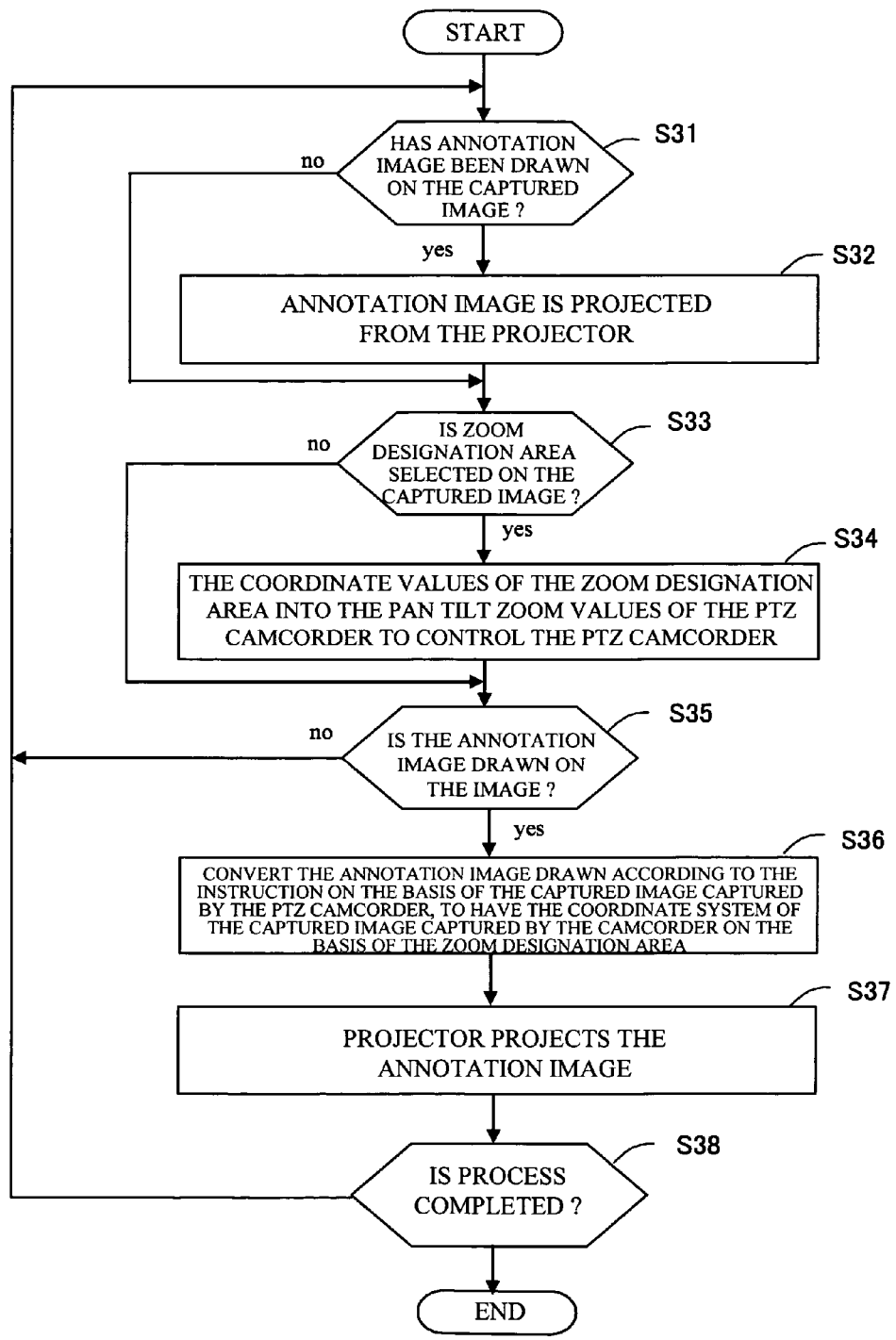
FIG. 5 is an operational flowchart of the remote instruction system.
Figure 6C:
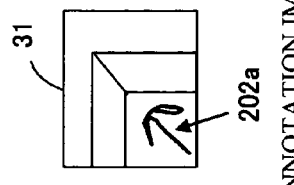
FIG. 6C is a view illustrating an annotation image drawn in the captured image of the PTZ camcorder.
Figure 6B:
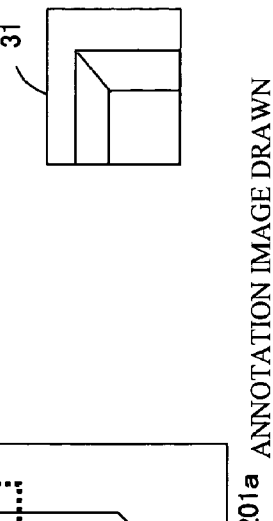
FIG. 6B is a view illustrating a captured image of a PTZ camcorder.
Figure 6A:
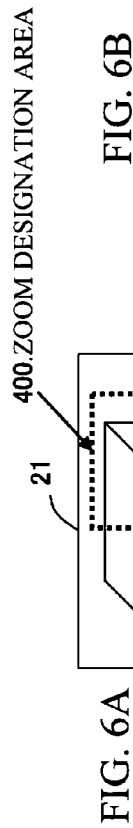
FIG. 6A is a view illustrating a zoom designation area designated in a captured image of a camcorder.
Figure 6E:
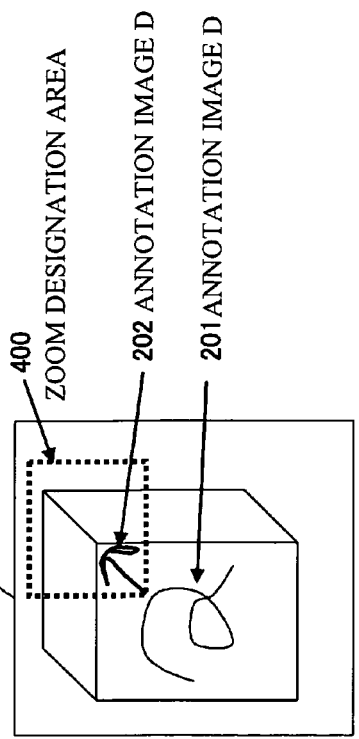
FIG. 6E is a view showing a captured image of the subject, onto which the annotation images and are projected, captured by the camcorder.
Figure 6D:
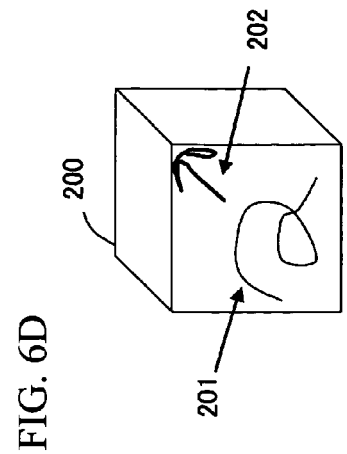
FIG. 6D is a view illustrating a subject onto which annotation images and are projected.
Figure 7A:
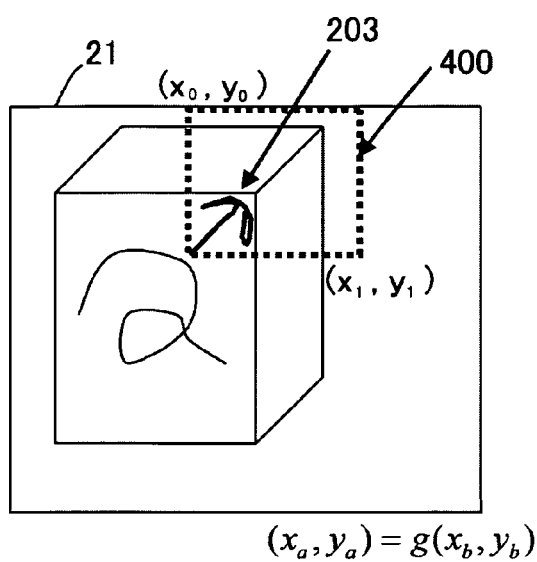
FIG. 7A and FIG. 7B are views illustrating conversion of coordinates of a zoom designation area and pan tilt zoom values of the PTZ camcorder.
Figure 7B:
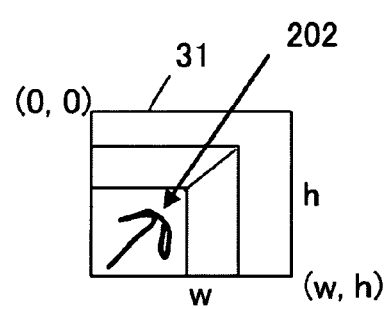

Next, a description is given of a process implemented by the remote instruction system 1 with the use of the camcorder 20 and the PTZ camcorder 30. FIG. 5 is an operational flowchart of the remote instruction system 1. FIG. 6A is a view illustrating a zoom designation area 400 designated in a captured image 21 of the camcorder 20. FIG. 6B is a view illustrating a captured image 31 of the PTZ camcorder 30. FIG. 6C is a view illustrating an annotation image 202a drawn in the captured image 31 of the PTZ camcorder 30. FIG. 6D is a view illustrating the subject 200 onto which annotation images 201 and 202 are projected. FIG. 6E is a view showing the captured image 21 of the subject 200, onto which the annotation images 201 and 202 are projected, captured by the camcorder 20. FIG. 7A and FIG. 7B are views illustrating conversion of coordinates of the zoom designation area 400 and pan tilt zoom values of the PTZ camcorder 30.

Figure 8:
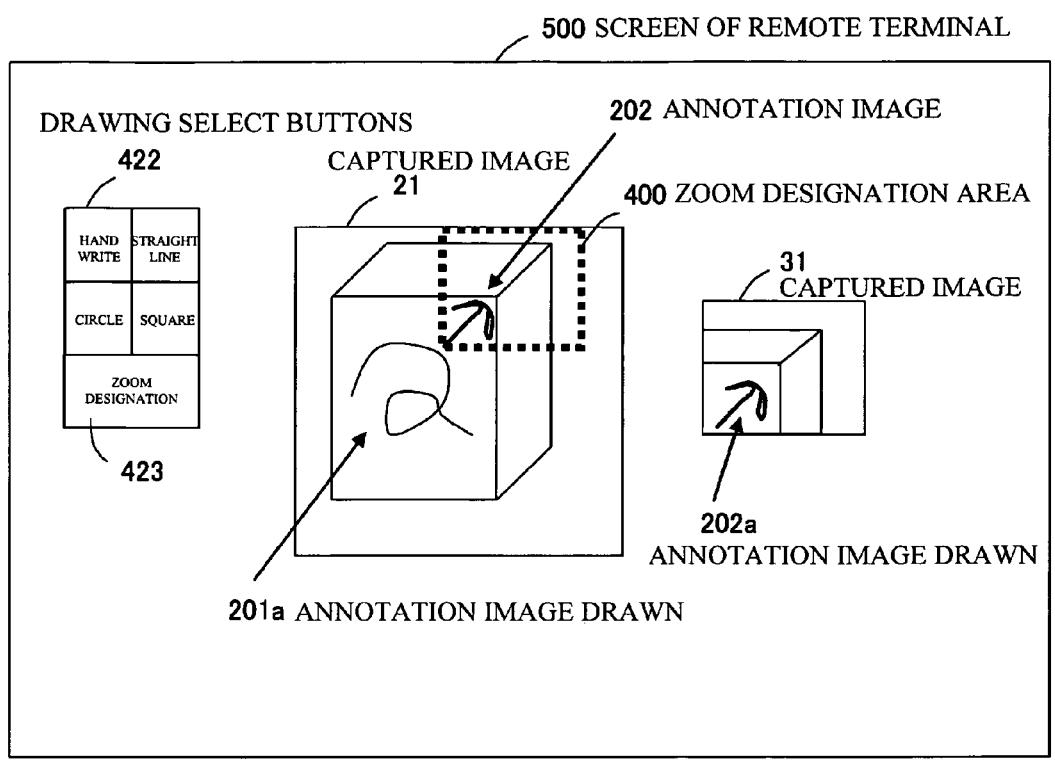
FIG. 8 shows an example of a user interface on the remote terminal.

FIG. 8 is a view showing a screen (user interface) of the remote terminal. A screen 500 of the remote terminal 100 displays the image 21 captured by the camcorder 20 and the capture image 31 captured by the PTZ camcorder 30 simultaneously. The user operates drawing select buttons 422 with the use of a pointing device 130 or the like, and selects a drawing method in order to draw the annotation image 201a either on the image 21 captured by the camcorder 20 or on the annotation image 201a captured by the PTZ camcorder 30. A zoom designation button 423 is provided in the drawing select buttons 422. By selecting the zoom designation button 423, it is possible to draw a rectangle (zoom designation area 400) on the image 21 captured by the camcorder 20.

Referring to FIG. 5, the operation is described. The subject 200 is captured by the camcorder 20. The server 50 continues transmitting the image captured by the camcorder 20 to the remote terminal 100 through the network 300 all the time. Now, suppose that the user draws the annotation image 201a in a color A on the image 21 captured by the camcorder 20, on the remote terminal 100. When the server 50 detects that the annotation image 201a has been drawn on the image 21 captured by the camcorder 20 (step S31), the annotation image received from the remote terminal 100 is converted to have a coordinate system of the projector 40 from that of the camcorder 20. Such converted annotation image is projected onto the subject 200 from the projector 40 (step S32). Thus, the annotation image 201 is actually projected onto the subject 200.

When the user designates the zoom designation area 400 on the remote terminal 100 with the use of the pointing device 130, the remote terminal 100 transmits coordinates (x0, y0, x1, y1) of the zoom designation area to the server 50. Here, as shown in FIG. 7A and 7B, (x0, y0) represents coordinates at the upper left, and (x1, y1) represents the coordinates at the lower right of the zoom designation area 400.

When the zoom designation area 400 is selected on the image captured by the camcorder 20 (step S33), the server 50 converts the coordinate values of the zoom designation area (selected given area) 400 received from the remote terminal 100 into the pan tilt zoom values (values necessary for magnification) of the PTZ camcorder 30 to control the PTZ camcorder 30 (step S34). Specifically, the server 50 calculates corresponding pan tilt zoom values (p, t, z) of the PTZ camcorder 30 on the basis of the coordinates (x0, y0, x1, y1) of the zoom designation area 400 in order to modify the zoom designation area 400 to a horizontal to vertical ratio of the image 31 captured by the PTZ camcorder 30. Here, an expression (1) is a conversion equation that converts the coordinates (x0, y0, x1, y1) of the zoom designation area 400 to the pan tilt zoom values (p, t, z) of the PTZ camcorder 30.

(Expression (1))

$$(p,t,z)=f(x_0,y_0,x_1,y_1) \quad (1)$$

A function "f" is a unique function to the camcorder 20 and the PTZ camcorder 30, and is measured in advance. The conversion with the function "f" may be carried out on the server 50, or may be carried out on the remote terminal 100 and the pan tilt zoom values (p, t, z) of the PTZ camcorder 30 be transmitted to the server 50 to control the PTZ camcorder 30.

Then, the server 50 transmits the pan tilt zoom values (p, t, z) of the PTZ camcorder 30 to the PTZ camcorder 30 to control the PTZ camcorder 30. In fact, there are limitations on the pan tilt zoom values (p, t, z) that can be controlled by the PTZ camcorder 30. Accordingly, the PTZ camcorder 30 is controlled by pan tilt zoom control values (p', t', z'), which are closest to the pan tilt zoom values (p, t, z). Next, the server 50 takes in the image 31 captured by the PTZ camcorder 30, and continues transmitting to the remote terminal 100 through the network 300. Upon receiving the image captured by the PTZ camcorder 30 from the server 50, the remote terminal 100 displays the captured image on the display apparatus 110. The user draws the annotation image 202a on the image 31 captured by the camcorder 30, and then the remote terminal 100 transmits drawing information of such drawn annotation image 202a to the server 50. According to the pan tilt zoom control values (p', t', z'), an actual zoom area corresponds to coordinates (x'0, y'0, x'1, y'1). This is calculated by an expression (2).

(Expression (2))

$$(x'_0,y'_0,x'_1,y'_1)=f^{-1}(p',t',z') \quad (2)$$

When it is detected that the annotation image is drawn on the image 31 captured by the PTZ camcorder 30 (step S35), the server 50 converts the annotation image 202a drawn according to the instruction on the basis of the image captured by the PTZ camcorder 30, to have the coordinate system of the image 21 captured by the camcorder 20 on the basis of the zoom designation area 400 (step S36). Specifically, the server 50 converts a coordinate system (xb, yb) of the image captured by the PTZ camcorder 30 to a coordinate system (xa, ya) of the captured image of the camcorder 20. An expression (3) is a conversion equation of this time.

(Expression (3))

$$(x_a,y_a)=g(x_b,y_b) \quad (3)$$

Here, a function "g" is obtained by affine transformations shown in expressions (4) and (5), with the use of coordinates (x0', y0', x1', y1') of an actual zoom area and an image size (w, h) of the image captured by the PTZ camcorder 30.

(Expression (4))

$$x_a = \frac{(x'_1 - x'_0)}{w}x_b + x'_0 \quad (4)$$

(Expression (5))

$$y_a = \frac{(y'_1 - y'_0)}{h}y_b + y'_0 \quad (5)$$

By the afore-described processes, the annotation image on the image 31 captured by the PTZ camcorder 30 is converted to the annotation image having the coordinate system of the image captured by the camcorder 20. Then, the server 50 converts the annotation image 202a based on the captured image 31 of the PTZ camcorder 30 to the coordinate system of the projector 40, and projects such converted annotation image onto the subject 200 (step S37). Thus, the annotation image 202 based on the image 31 captured by the PTZ camcorder 30 is projected onto the subject 200. Here, the server 50 may convert (xb, yb) to (xa, ya), or may be converted on the remote terminal 100 and be transmitted to the server 50 by way of the network. In this manner, the pan tilt zoom values of the PTZ camcorder 30 are measured, being corresponding to the position of the rectangle in the image captured by the camcorder 20. It is therefore possible to control the PTZ camcorder 30 on the basis of the pan tilt zoom values by measuring the pan tilt zoom values of the PTZ camcorder 30 with respect to the position of the rectangular in the image captured by the camcorder 20, and it is possible to project the annotation image designated on the image 31 captured by the PTZ camcorder 30 onto the subject 200 from the projector 40.

Figure 9:
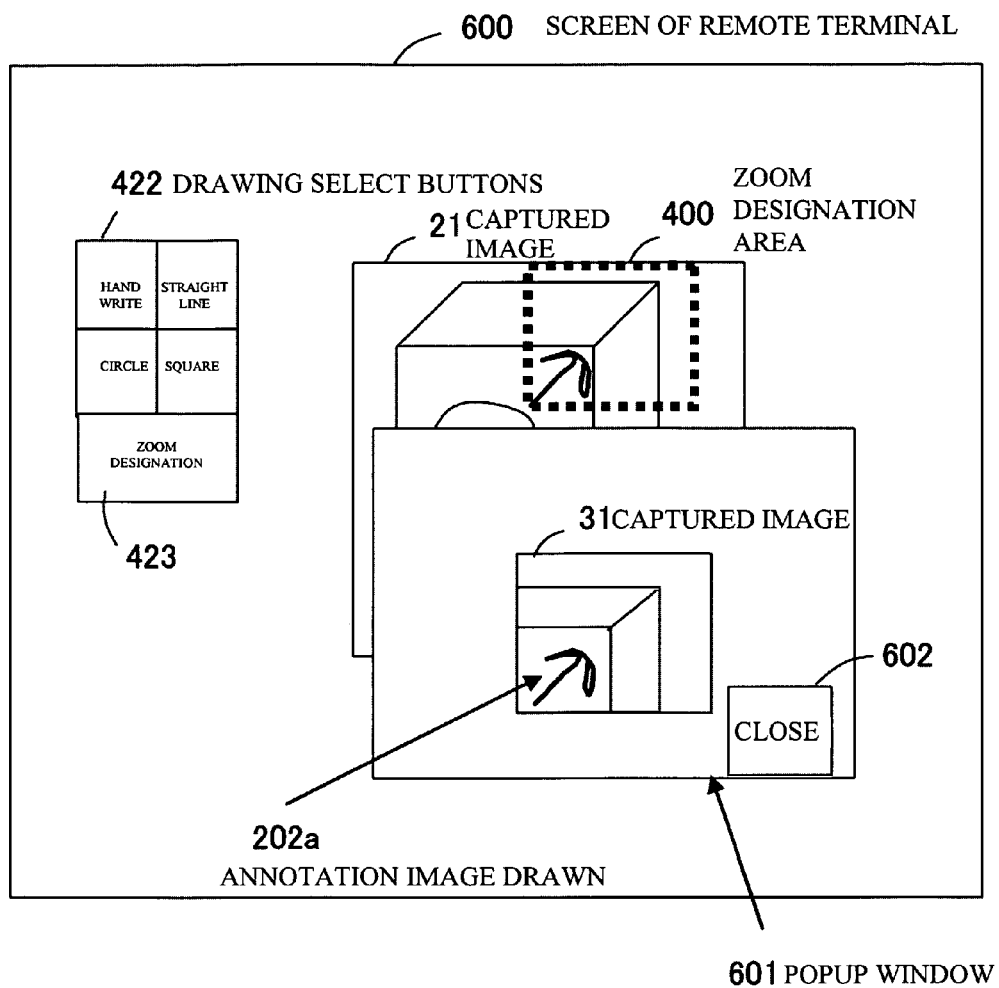
FIG. 9 shows a variation example of the user interface on the remote terminal.

FIG. 9 shows a variation example of the user interface on the remote terminal 100. The remote terminal 100 displays only the captured image 21 on a screen 600 of the remote terminal. The user operates the drawing select buttons 422 with the use of the pointing device 130 or the like to select a drawing method, and draws the annotation image on the captured image 21. The zoom designation button 423 is provided in the drawing select buttons 422. By selecting the zoom designation button 423, the zoom designation area 400 can be drawn on the captured image 21. Then, a popup window 601 is automatically opened, when the zoom designation area 400 is drawn in the captured image 21. The image 31 captured by the PTZ camcorder 30 is displayed on the popup window 601, so the drawing method is selected by use of the drawing select buttons 422 to draw the annotation image 202a on the basis of the PTZ camcorder 30. The popup window 601 is provided with a close button 602. The user is able to close the popup window 601 by operating the close button 602, thereby saving the area on the screen.

Figure 10:
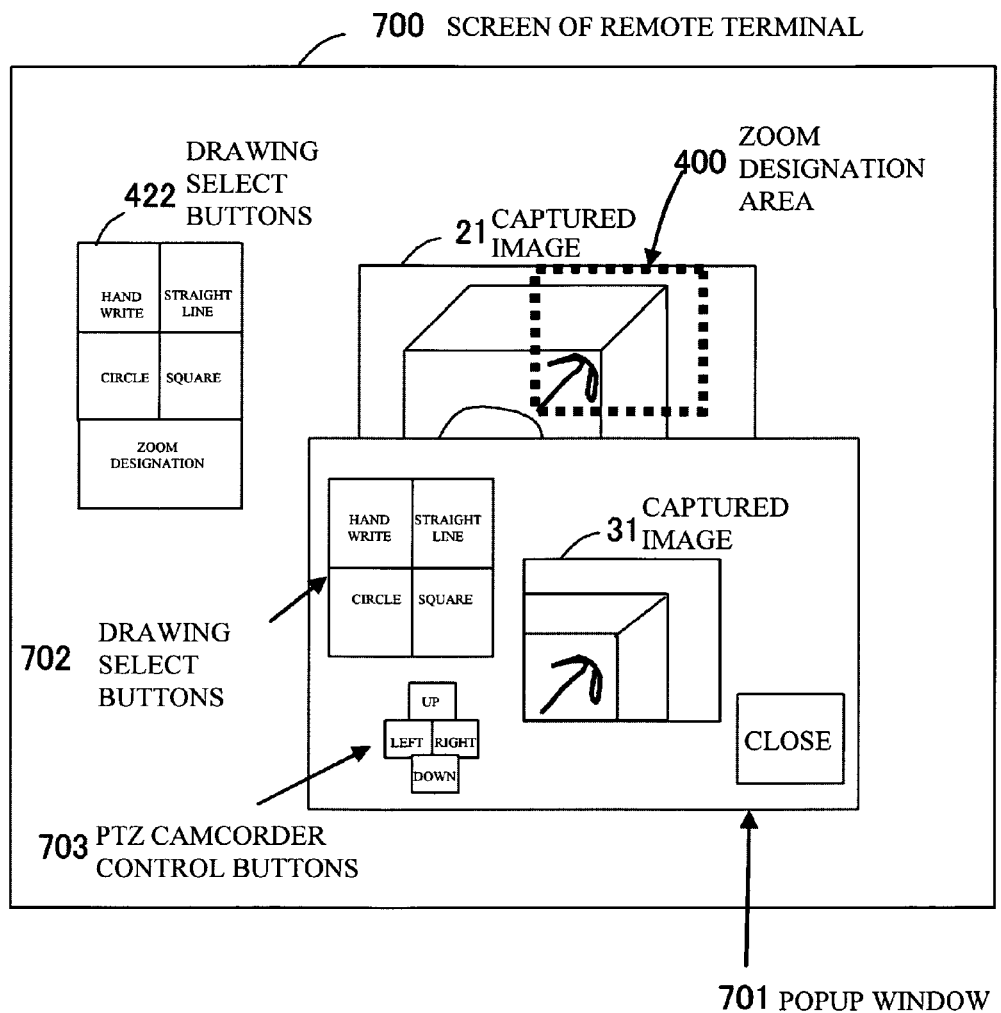
FIG. 10 shows another variation example of the user interface on the remote terminal.

FIG. 10 shows another variation example of the user interface on the remote terminal 100. A user interface 700 also includes drawing select buttons 702 provided on a popup window 701. With the drawing select buttons 702, it is possible to arrange or select buttons different from the drawing select buttons 422. The popup window 701 is also provided with PTZ camcorder control buttons 703. The user operates the PTZ camcorder control buttons 703 so that that user is able to move the PTZ camcorder 30 installed on a remote site upwardly and downwardly, right and left, on the popup window 701. When the popup window 701 is opened, the remote terminal 100 starts sending and receiving the image 31 captured by the PTZ camcorder 30. When the popup window 701 is closed, the remote terminal 100 stops sending and receiving the captured image 31. This makes it possible to prevent the communication band from being wasted, while the capture image 31 captured by the PTZ camcorder 30 is not being displayed.

Figure 11:
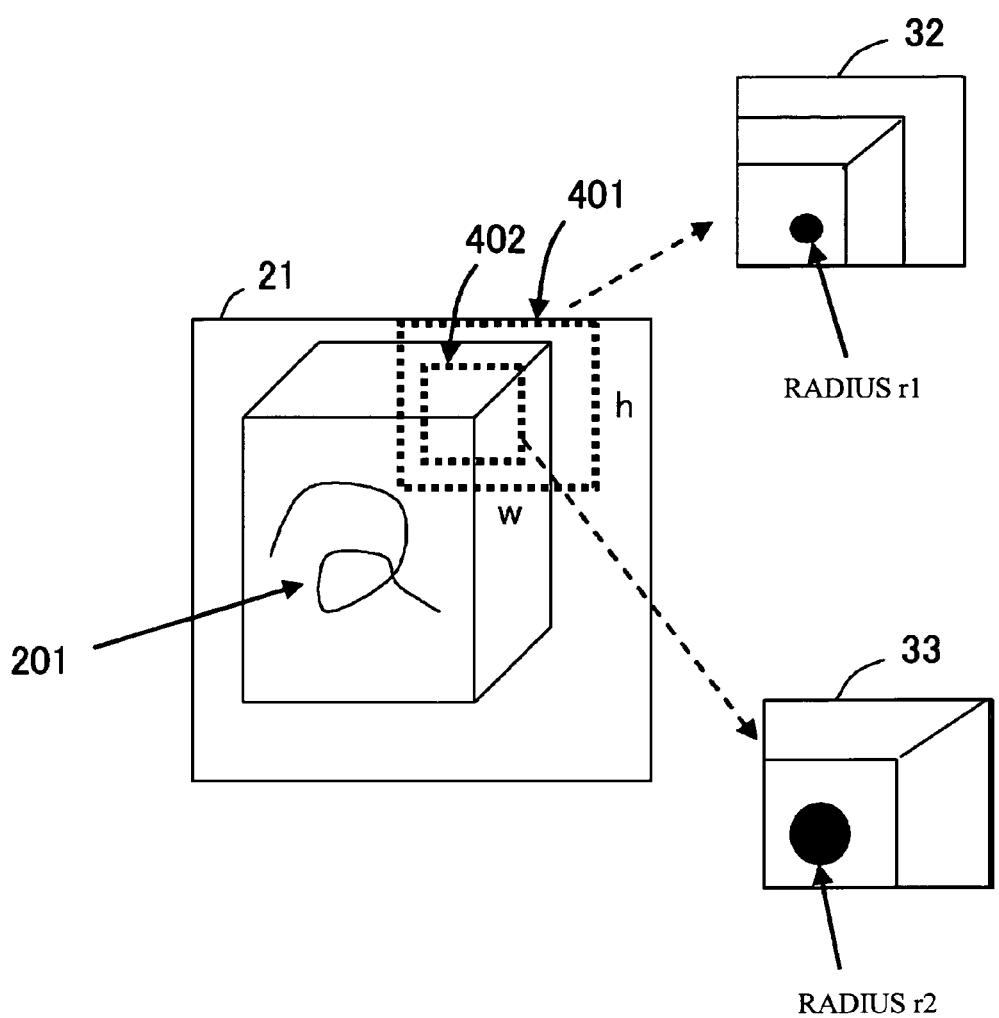
FIG. 11 shows a variation example relating to drawing the annotation image on the captured image of the PTZ camcorder.

FIG. 11 shows a variation example relating to drawing the annotation image on the captured image of the PTZ camcorder 30. When the annotation image is drawn on the image captured by the PTZ camcorder 30, the captured image being magnified on the remote terminal, as a magnifying factor of the PTZ camcorder 30 is increased, the accuracy is degraded and the resolution that can be displayed by the projector 40 is limited. So, a minimum unit in which the annotation image can be drawn is determined on the captured image of the PTZ camcorder 30, according to the magnifying factor of the image captured by the PTZ camcorder 30. Here, the minimum unit is configured as a radius "r". The minimum unit may be configured as r×r (pixels). The radius "r" varies depending on the magnifying factor. As the magnifying factor is increased, the radius "r" is increased.

As shown in FIG. 11, if the user designates a zoom designation area 401 having a small magnifying factor, a radius r1 is the minimum unit in which the annotation image can be drawn in an image 32 captured by the PTZ camcorder 30. If the user designates a zoom designation area 402 having a large magnifying factor, a radius r2 greater than the radius r1 is the minimum unit in which the annotation image can be drawn in an image 33 captured by the PTZ camcorder 30. The radius "r" can be calculated with a zoom parameter "z" of the PTZ camcorder 30. The radius "r" may be calculated on the remote terminal 100, or may be calculated on the server 50. According to an exemplary embodiment of the present invention, an area is selected from a wide-angle image captured by the camcorder 20 to control the PTZ camcorder 30 and magnify the image. However, the designated area by the camcorder 20 is magnified by digital zooming the image captured by the camcorder 20, without using the PTZ camcorder 30.

According to the above-described exemplary embodiment of the present invention, a description has been given of the technique of controlling the PTZ camcorder 30 by selecting the area from the wide-angle image captured by the camcorder 20 (FlySPEC) being utilized together with the technique of drawing the annotation image in the image on the remote terminal and projecting the annotation image onto the subject (iLight), so as to learn which area the PTZ camcorder 30 displays on the camcorder 20, with the information on the zoom designation area. It is thus possible project the annotation image drawn on the image captured by the PTZ camcorder 30 onto the subject 200 by the projector 40. In addition, it does not have to measure the pan tilt zoom or correspondence of image coordinates of the PTZ camcorder 30 and those of the projector 40, demanding a smaller calculation amount.

According to the above-described exemplary embodiment of the present invention, a description has been given of the projector employed as a projection portion. However, the projection portion is not limited to the projector. For example, it is possible to form an image by radiating, for example, the laser beam or the like to the subject.

According to the above-described exemplary embodiment of the present invention, a description has been given of the rotation stage employed as a relative position changing portion. However, the relative position changing portion is not limited to the rotation stage. For example, a robot or the like may be employed as the relative position changing portion.

According to the above-described exemplary embodiment of the present invention, a description has been given of a case where the subject is moved. However, it may be configured such that the camcorder serving as an image capturing portion and the projector serving as a projection portion are moved.

According to the above-described exemplary embodiment of the present invention, a description has been given of the rotation buttons R1 and R2 formed on the display screen 111 to instruct the rotation of the rotation stage 70. However, the present invention is not limited to this, and may employ a keyboard or other various methods.

According to the above-described exemplary embodiment of the present invention, a description has been given of a case where the remote terminal 100 is connected to the server, 50 through the network 300. However, the present invention is not limited to this. The remote terminal 100 may be connected to the server by another method, and the remote terminal 100 may be provided on the side of the subject 200.

According to the above-described exemplary embodiment of the present invention, the image captured by the camcorder 20 and the image captured by the PTZ camcorder 30 may be transmitted to a remote site from another type of hardware, instead of the server 50, through the network 300.

A remote instruction method according to an exemplary embodiment of the present invention is realized by the subject side apparatus 10. The server 50 is realized by Central Processing Unit (CPU), Read Only Memory (ROM), Random Access Memory (RAM), and the like.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A remote instruction system comprising a control portion,
    the control portion transmitting a first image to a remote terminal and controlling a projection portion to project a first annotation image onto a subject according to an instruction issued from the remote terminal on the basis of the first image,
    the control portion transmitting a second image to the remote terminal and controlling the projection portion to project a second annotation image onto the subject according to the instruction issued from the remote terminal on the basis of the second image,
    the first image being captured by a first image capturing portion provided for capturing the first image of the subject,
    the second image being captured by a second image capturing portion provided for zooming a given area of the subject to capture the second image, when the given area in the first image is selected from the remote terminal,
    a minimum unit in which the second annotation image being drawn is determined based on a zooming factor of the second image.

2. The remote instruction system according to claim 1, wherein the control portion converts coordinates of the selected given area to values used for zooming with the use of the second image capturing portion to control zooming of the second image captured by the second image capturing portion.

3. The remote instruction system according to claim 1, wherein the control portion converts the second annotation image according to the instruction on the basis of the second image captured by the second image capturing portion to have a coordinate system of the first image capturing portion, and then controls the projection portion to project the converted annotation image onto the subject.

4. The remote instruction system according to claim 1 further comprising a relative position changing portion that changes a relative positional relationship of the subject with respect to the projection portion, the first image capturing portion, and the second image capturing portion,
    wherein the control portion changes a projection position of the second annotation image according to the instruction on the basis of the second image captured by the second image capturing portion in accordance with the subject moved by the relative position changing portion.

5. The remote instruction system according to claim 4, wherein the relative position changing portion includes a rotation stage that can rotate the subject.

6. A remote instruction method comprising:
    transmitting a first image to a remote terminal;
    controlling to project a first annotation image onto a subject according to an instruction issued from the remote terminal on the basis of the first image;
    transmitting a second image to the remote terminal; and
    controlling to project a second annotation image onto the subject according to the instruction issued from the remote terminal on the basis of the second image,
    the first image being captured by a first image capturing portion provided for capturing the first image of the subject,
    the second image being captured by a second image capturing portion provided for zooming a given area of the subject to capture the second image, when the given area in the first image is selected from the remote terminal,
    a minimum unit in which the second annotation image being drawn is determined based on a zooming factor of the second image.

7. The remote instruction method according to claim 6 further comprising converting the second annotation image according to the instruction on the basis of the second image captured by the second image capturing portion to have a coordinate system of the first image capturing portion.

8. A computer readable medium storing a program causing a computer to execute a process for remote instruction, the process comprising:
    transmitting a first image to a remote terminal;
    controlling to project a first annotation image onto a subject according to an instruction issued from the remote terminal on the basis of the first image;
    transmitting a second image to the remote terminal; and
    controlling to project a second annotation image onto the subject according to the instruction issued from the remote terminal on the basis of the second image,
    the first image being captured by a first image capturing portion provided for capturing the first image of the subject,
    the second image being captured by a second image capturing portion provided for zooming a given area of the subject to capture the second image, when the given area in the first image is selected from the remote terminal,
    a minimum unit in which the second annotation image being drawn is determined based on a zooming factor of the second image.

9. A remote instruction system comprising a control portion and a relative position changing portion,
    the control portion transmitting a first image to a remote terminal and controlling a projection portion a first annotation image onto a subject according to an instruction issued from the remote terminal on the basis of the first image,
    the control portion transmitting a second image to the remote terminal and controlling the projection portion to project a second annotation image onto the subject according to the instruction issued from the remote terminal on the basis of the second image,
    the first image being captured by a first image capturing portion provided for capturing the first image of the subject,
    the second image being captured by a second image capturing portion provided for zooming a given area of the subject to capture the second image, when the given area in the first image is selected from the remote terminal, the relative position changing portion that changes a relative positional relationship of the subject with respect to the projection portion, the first image capturing portion, and the second image capturing portion, wherein the control portion changes a projection position of the second annotation image according to the instruction on the basis of the second image captured by the second image capturing portion in accordance with the subject moved by the relative position changing portion.

10. A remote instruction system comprising a control portion and a rotation stage, the control portion transmitting a first image to a remote terminal and controlling a projection portion a first annotation image onto a subject according to an instruction issued from the remote terminal on the basis of the first image, the control portion transmitting a second image to the remote terminal and controlling the projection portion to project a second annotation image onto the subject according to the instruction issued from the remote terminal on the basis of the second image, the rotation stage that is operated by the control portion and can rotate the subject according to the instruction issued by the remote terminal, the first image being captured by a first image capturing portion provided for capturing the first image of the subject, the second image being captured by a second image capturing portion provided for zooming a given area of the subject to capture the second image, when the given area in the first image is selected from the remote terminal.

* * * * *